US012664371B1

(12) United States Patent
Bhat

(10) Patent No.: US 12,664,371 B1
(45) Date of Patent: Jun. 23, 2026

(54) CONVERSATIONAL INTERFACE FOR MULTI-CLOUD INFRASTRUCTURE MANAGEMENT AND ORCHESTRATION

(71) Applicant: AVIATRIX SYSTEMS, INC., Santa Clara, CA (US)

(72) Inventor: Abhishek Bhat, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 502 days.

(21) Appl. No.: 17/460,269

(22) Filed: Aug. 29, 2021

Related U.S. Application Data

(60) Provisional application No. 63/072,929, filed on Aug. 31, 2020.

(51) Int. Cl.
 *G06F 40/30* (2020.01)
 *G06F 40/279* (2020.01)

(52) U.S. Cl.
 CPC ............ *G06F 40/30* (2020.01); *G06F 40/279* (2020.01)

(58) Field of Classification Search
 CPC .... G06F 40/30; G06F 40/279; G06F 16/3329; G06F 16/3344; G06F 16/245; G06F 40/205; G06F 40/295; G06F 40/284; G06F 40/40; G06F 40/20; G06F 40/211; G06F 40/56; G06F 40/289; G06F 40/58
 See application file for complete search history.

(56) References Cited

U.S. PATENT DOCUMENTS

| | | | | |
|---|---|---|---|---|
| 11,475,053 | B1 * | 10/2022 | Das | G06F 16/3322 |
| 2017/0220574 | A1 * | 8/2017 | Liensberger | G06F 16/24522 |
| 2017/0357637 | A1 * | 12/2017 | Nell | G06F 40/35 |
| 2019/0013019 | A1 * | 1/2019 | Lawrence | G10L 15/1815 |
| 2019/0138661 | A1 * | 5/2019 | Paltanavicius | G10L 15/08 |
| 2020/0050949 | A1 * | 2/2020 | Sundararaman | G06F 40/284 |
| 2020/0387550 | A1 * | 12/2020 | Cappetta | G06F 16/9538 |

* cited by examiner

Primary Examiner — Richemond Dorvil
Assistant Examiner — Zeeshan Mahmood Shaikh
(74) *Attorney, Agent, or Firm* — Jackson Walker LLP

(57) ABSTRACT

In one embodiment, a system for managing a multi-cloud infrastructure is described. The system comprises a conversation analytic service and fulfillment logic. The conversation analytic service is configured to (i) translate incoming data pertaining to query into one or more groups of words, (ii) process the one or more groups of words into a resultant word group for determining an intent associated with the incoming data, and (iii) generate an event request message that includes content identifying the intent associated with the incoming data. The fulfillment logic is communicatively coupled to the conversation analytic service and is configured to retrieve data associated with the intent from cloud resources. The retrieved data is returned to the conversation analytic service for generation of a response to the query associated with the incoming data.

16 Claims, 4 Drawing Sheets

CONVERSATIONAL INTERFACE FOR MULTI-CLOUD INFRASTRUCTURE MANAGEMENT AND ORCHESTRATION

CROSS-REFERENCE TO RELATED APPLICATIONS

This applications claims the benefit of priority on U.S. Provisional Patent Application No. 63/072,929 filed Aug. 31, 2020, the entire contents of which are incorporated by reference herein.

FIELD

Embodiments of the disclosure relate to the field of networking. More specifically, one embodiment of the disclosure relates to a system and method that supports a conversational (e.g., audio-based) interface for use in multi-cloud infrastructure management and orchestration.

GENERAL BACKGROUND

Over the past few years, cloud computing has provided an Infrastructure as a Service (IaaS), where resources are provided as part of a public cloud network and made accessible to tenants as a service. One of these services allows tenants to run software components (e.g., virtual machines instances such as virtual servers) residing within the public cloud network. Given the migration of software functionality into public cloud networks, there is an increased need in the management of virtual private cloud networks (VPCs) deployed within the public cloud networks.

A virtual private cloud network (VPC) generally refers to an on-demand, configurable pool of shared resources, which are allocated within the cloud computing platform and provide a certain level of isolation between the different persons, organizations or other entities (hereinafter, "users") using the resources. The isolation between one VPC user from other users of the same public cloud network may be achieved through allocation of a private Internet Protocol (IP) subnet and virtual constructs (e.g., virtual computing services, virtual storage services, etc.) on a per user basis. Of course, a VPC may be described by other terminology such as "VNet," which constitutes a virtual network representation in a public cloud.

Given the expansive need for VPC and other cloud services, users are relying increasingly on VPCs associated with different public cloud networks. Management of VPCs throughout multiple public cloud networks is complex and requires dedication by an administrator to logon to a controller managing controls of the VPC, physically typing queries to gather data from different VPCs and visually reviewing the gathered data in efforts to understand the health of the cloud-based services utilized by the user. A better (and more efficient) interaction interface to manage and orchestrate multi-cloud infrastructure is needed.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
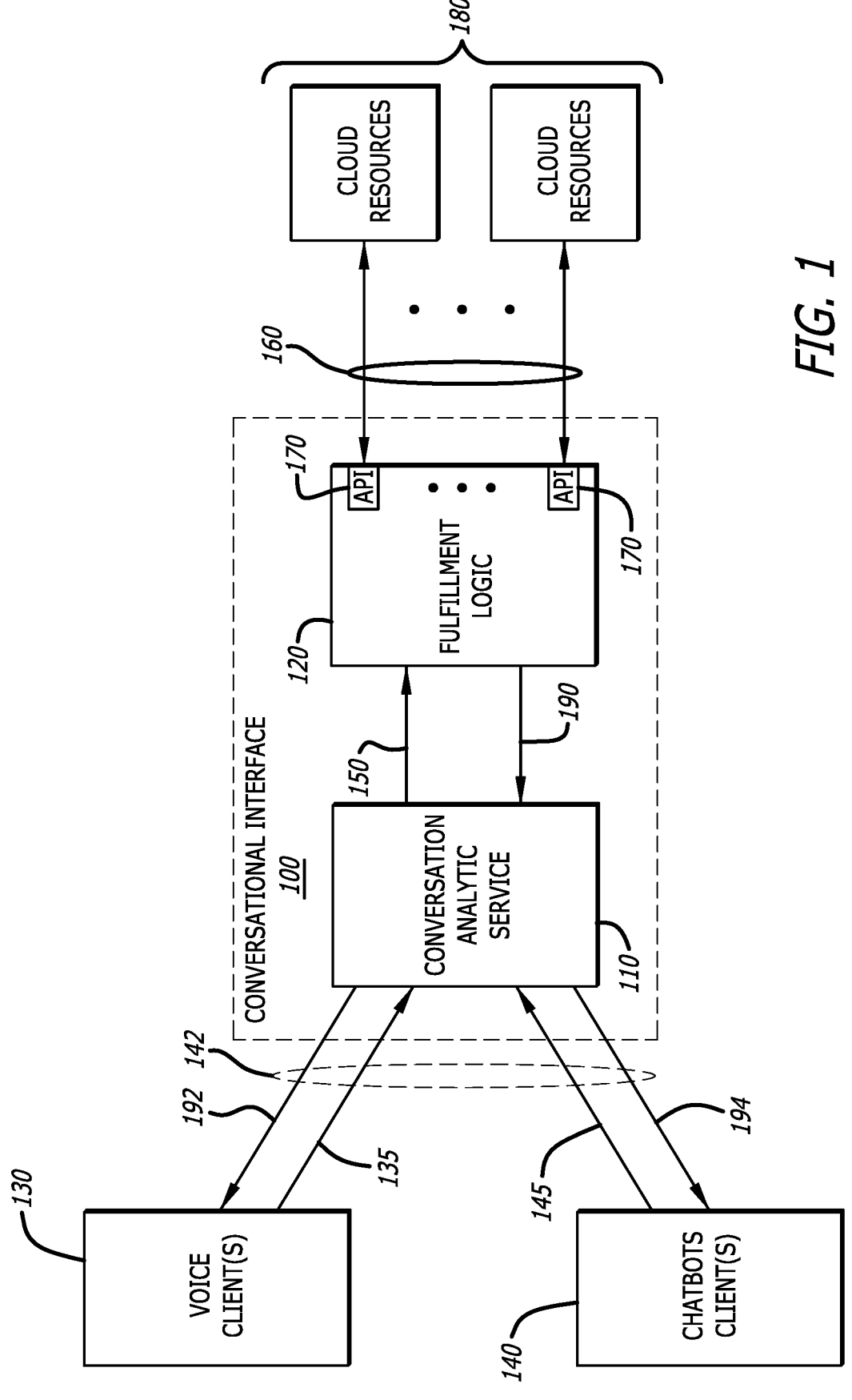
FIG. 1 is a diagram of an exemplary embodiment of a conversational interface including a conversation analytic service and fulfillment logic that collectively operate to provide an audio and/or text-based multi-cloud management or orchestration.

Embodiments of a system and method for establishing a conversational interface for multi-cloud infrastructure management and orchestration (e.g., arrangement of software components) is described. Capable of being deployed as a public cloud network service or as a service operating on a virtual private cloud network (VPC), the conversational interface enables input sources associated with a user (e.g., voice clients, chatbot clients, etc.) to interact, based on received queries such as audio or text-based inputs, with one or more software components associated with a multi-cloud infrastructure. Conducted in accordance with a "push" or "pull" communication technique, the interaction may be directed to altering operability of the cloud resources associated with the user, gathering information from multi-cloud sources based on a single query initiated from one of the input sources, or communicating various types of alerts to the user.

According to one embodiment of the disclosure, the conversational interface includes a conversation analytic service and fulfillment logic. The conversation analytic service is configured to receive input data from one or more input sources, such as one or more voice clients (hereinafter, "voice client(s)") and/or one or more chatbot clients (hereinafter, "chatbot client(s)") for example. With respect to input data from the voice client(s), the conversation analytic service translates the received input data in the form of audio signals into one or more groups of words (e.g., string of any combination of characters, symbols, etc.) and organizes the word groups into a resultant word group for analysis. Each resultant word group may be formed by parsing the word groups, identifying words that are linguistically significant in determining the intent of the input data, and removing information that is insignificant in capturing such intent (e.g., unnecessary character string used in natural language programming (NLP) to express intent such as removal of conjunctions and/or verbs while nouns may have normally higher significance; duplicative words, etc.). The "intent" may constitute an intended purpose behind the input data.

With respect to input data from the chatbot client(s), the conversation analytic service receives the text-based chat and organizes the word groups associated with the text-based chat into a resultant word group for analysis. Similar to the description above, the resultant word group may be formed by parsing the word groups and removing information that is immaterial in capturing the intent of the input data.

Herein, according to one embodiment of the disclosure, the conversation analytic service generates an event request message that is directed to the intent of the input data (e.g., query for general multi-cloud status, request for multi-cloud infrastructure metrics, instructions to alter operability of certain software components within the multi-cloud network, etc.) along with information (perimeters) that are needed by the fulfillment logic to complete the event request message for the particular intent. As an illustrative example, in response to a query "send me a report of the resource usage in my cloud networks" from an input source, the conversation analytic service may be configured to parse and organize this word group into a resultant word group "report resource usage cloud networks." Responsive to the generation of the resultant word group, the conversation analytic service may leverage machine learning to understand what the user is saying (NLP) via managed services such as Amazon Web Services (AWS) Lex™ or Google Cloud Platform (GCP) DialogFlow™.

After determination of the intent of the input data and sufficient keywords are identified that will prompt the fulfillment logic to gather information associated with these keywords, the conversation analytic service may be configured to generate an event request message including fields directed to gathering of data directed to the intent. For instance, the event request message may include fields identifying different cloud resources (e.g., compute usage, storage usage, etc.). However, upon determining insufficient keywords have been identified, the conversation analytic service may be configured to return query messages to prompt retrieval of the information (e.g., keywords) needed to generate the event request message. For example, where the query was "send me a report of the resource usage in my cloud network," the conversation analytic service may return one or more reply messages to solicit more data to complete the query: "which cloud network or combination of cloud networks—AWS? Azure? GCP?"

It is contemplated that the conversation analytic service may be configured to generate an event request message, which is provided to the fulfillment logic. Herein, the event request message may include fields directed in response to the gathering of data associated with the intent of the query from multiple (two or more) cloud providers (e.g., AWS, GCP etc.). The gathered data is returned as an event response message to the particular input source initiating the request as an audio-based response or a text-based response. It is contemplated that the logic associated with the handling of requests from the input sources may be deployed in any variation within the conversion analytic service and/or the fulfillment logic.

I. Terminology

In the following description, certain terminology is used to describe features of the invention. In certain situations, the terms "logic," "component," and/or "controller" is representative of hardware, software or a combination thereof, which is configured to perform one or more functions. As hardware, the logic (or component/controller) may include circuitry having data processing or storage functionality. Examples of such circuitry may include, but are not limited or restricted to a physical processor such as a microprocessor, one or more processor cores, a programmable gate array, a microcontroller, an application specific integrated circuit, or other component with data processing functionality (e.g., wireless receiver, transmitter and/or transceiver circuitry), semiconductor memory, or combinatorial logic.

Alternatively, or in combination with the hardware circuitry described above, the logic (or component/controller) may be software in the form of one or more software modules. The software module(s) may be executed by a physical processor or a logical processor that is a software representative of a physical processor. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM," power-backed RAM, flash memory, phase-change memory, etc.), a solid-state drive, hard disk drive, an optical disc drive, or a portable memory device. As software, the logic (or component/controller) may operate as firmware stored in persistent storage.

The term "computerized" generally represents that any corresponding operations are conducted by hardware in combination with software.

The term "controller" may refer to a software instance deployed within a cloud computing environment that manages operability of certain aspects of one or more cloud computing environments that may span across different public cloud networks (multi-cloud network). According to one embodiment of the disclosure, the controller may be a resource to control resources (e.g., gateways, etc.) of one or more virtual private cloud networks (VPCs) overlaying a public cloud network. The controller may be executed by a processor, inclusive of a physical processor or a logical processor (e.g., Amazon® EC2 compute engine, Google® compute engine, etc.). For instance, a controller may be configured to collect information pertaining to each VPC and/or each gateway instance and configures one or more routing tables associated with one or more VPCs and/or gateway instances spanning a multi-cloud network to establish and/or maintain communication links (e.g., logical connections) between different sources and destinations. These sources and/or destinations may include, but are not restricted or limited to on-premises computing devices, gateway or other types of cloud resources.

The term "gateway" may be construed as a virtual or physical logic. For instance, as an illustrative example, the gateway may correspond to virtual logic in the form of a software instance, such as a virtual machine (VM)-based data routing component that is assigned a Private IP address within an IP address range associated with a VPC including the gateway. The gateway allows Cloud Service Providers (CSPs) and enterprises to enable traffic routing between virtual and physical networks, including a public network (e.g., Internet). Alternatively, in some embodiments, the gateway may correspond to physical logic, such as an electronic device that is communicatively coupled to the network and assigned the hardware (MAC) address and IP address.

The term "message" generally refers to information in a prescribed format and transmitted in accordance with a suitable delivery protocol. Hence, each message may be in the form of one or more packets, frames, or any other series of bits having the prescribed format. A "word" is string of any combination of characters, symbols, or other indicia to form a discrete communicative element.

The term "transmission medium" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. System Architecture

Referring to FIG. 1, a diagram of an exemplary embodiment of a system featuring a processor and a conversational interface 100, namely logic including a conversation analytic service 110 and fulfillment logic 120. The conversational analytic service 110 and the fulfillment logic 120 are stored in non-transitory storage medium and collectively operate, upon execution by the processor, to provide for audio-based and/or text-based multi-cloud management or orchestration. The conversational interface 100 is communicatively coupled to one or more input sources, such as one or more voice clients (hereinafter, "voice client(s)") 130 and/or one or more chatbot clients (hereinafter, "chatbot client(s)") 140 through a transmission medium 142. The voice client(s) 130 may be configured to capture a query such as audio (voice) input data, digitize the audio input data, and route the digitized audio data 135 to the conversational interface 100. Examples of voice client(s) 130 may include, but are not limited or restricted to Amazon® Alexa®, Google® Assistant™ or another type of voice assistant. Different from the voice client(s) 130, the chatbot client(s) 140 may be configured to provide receive a query in the form of audio input data and convert the same into a text-based chat 145 for transmission to the conversational interface 100. Examples of chatbot client(s) 140 may include, but are not limited or restricted to Slack® bots, Facebook® Messenger™, Microsoft® Power Virtual Agents™, etc.).

In particular, with respect to the digitized audio data 135 from the voice client(s) 130, the conversation analytic service 110 of the conversational interface 100 is configured, when executed, to translate the digitized audio data 135 into one or more groups of words, and subsequently, to process the one or more word groups into a resultant word group for analysis. Examples of the conversation analytic service 110 may include, but it is not limited or restricted to AWS Lex™ or GCP DialogFlow™ for example. More specifically, the processing of the word groups into the resultant word group may involve (i) parsing the word groups, (ii) identifying words through natural language programming (NLP) processing by the conversation analytic service 110 that are significant in determining intent of the digitized audio data 135, and (iii) removing those words that is insignificant in capturing such intent (e.g., conjunctions, certain verbs, duplicate words, etc.). The "intent" may constitute an intended purpose behind the audio input data.

With respect to the text-based chat 145, as described above, the conversation analytic service 110 organizes the text-based chat 145 into word groups and transition these word groups in the resultant word group for analysis. Similar to the description above, the resultant word group may be formed by (i) parsing the word groups, (ii) identifying words used in natural language programming (NLP) processing by the conversation analytic service 110 that are significant in determining intent of the text-based chat 145, and (iii) removing those words that is insignificant in capturing such intent.

As intent is being determined, the conversation analytic service 110 generates an event request message 150, the content of event request message may be based, at least in part, on the determined intent of the input data. In particular, the parameters (fields) associated with the event request message 150 may vary depending on its message type. For instance, as an illustrative example, a request message for a specific query (e.g., amount of compute resources used, amount of available cloud storage, etc.) may have a lesser number of fields than a more general query (e.g., health of the multi-cloud system). The number of fields, sometimes referred to as "slots," provide the parameters needed to initiate a query to resources within a public or private cloud network into which the conversational interface 100 is installed as well as other public or private cloud networks.

After determination of the intent of the input data 135 or 145 and sufficient keywords are identified that will prompt the fulfillment logic 120 to gather information associated with these keywords, the conversation analytic service 110 may be configured to generate the event request message 150 including slots allocated with information used to gather data that is directed to the intent. In contrast, upon determining insufficient keywords have been identified, the conversation analytic service 110 may be configured to return reply messages (not shown) to the requesting input source 130 and/or 140 to prompt retrieval of additional context information (e.g., keywords, etc.) needed to generate the event request message 150.

The fulfillment logic 120 is configured to receive the event request message 150 and retrieve data that is directed to the intent behind the input data 135 or 145. Such retrieval may be accomplished by retrieving the data 160 through one or more Application Programming Interfaces (APIs) 170 directed to cloud resources 180. These cloud resources 180 may include a controller and data locally stored by the controller, a gateway and data locally stored by the gateway, or another virtual component that may reside within one or more virtual private cloud networks that may reside within a single public cloud network or a multi-cloud (public) network. Stated differently, the cloud resources 180 may be within the same public cloud network or different public cloud networks. The retrieved data 160 is returned as an event response message 190 (e.g., an audio-based response 192 or a text-based response 194) to the particular input source (e.g., voice client 130 or chatbot client 140) that provided the input data 135 or 145 to the conversational interface 100.

Figure 2:
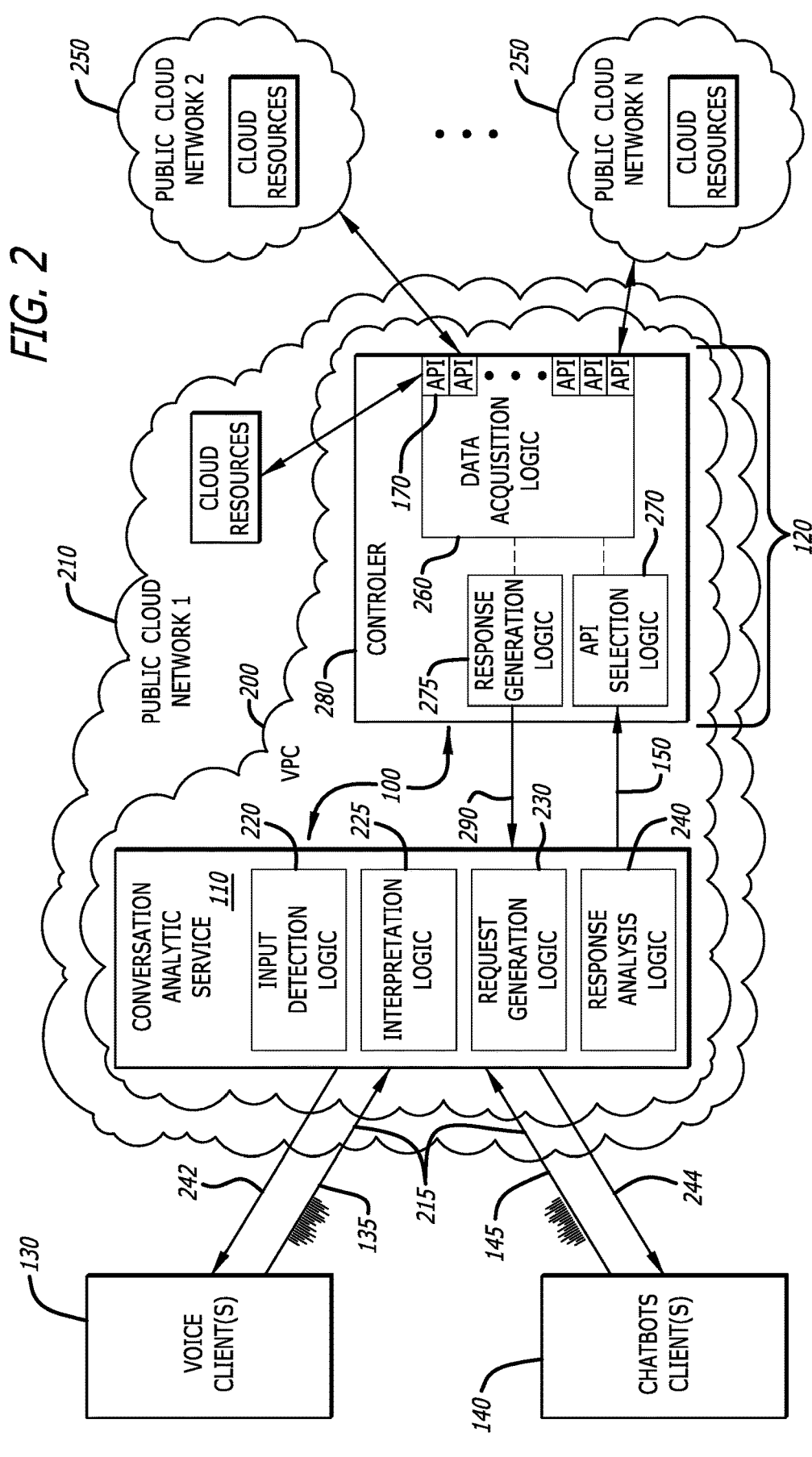
FIG. 2 is a first exemplary embodiment of a virtual private cloud, deployed within a first public cloud network, that includes the conversational interface of FIG. 1.

Referring now to FIG. 2, a first exemplary embodiment of a virtual private cloud (VPC) 200, deployed within a first public cloud network 210, that includes the conversational interface 100 of FIG. 1 is shown. The conversation analytic service 110 of the conversational interface 100 is communicatively coupled to the voice client(s) 130 and/or the chatbot client(s) 140. As stated above, the voice client(s) 130 may be configured to capture the audio (voice) data, digitize the audio data, and route the digitized audio data 135 to the conversation analytic service 110. The chatbot client(s) 140 may be configured to provide receive audio (voice) and convert the audio into the text-based chat 145 for transmission to the conversation analytic service 110.

In particular, the conversation analytic service 110 may be configured to include input detection logic 220, interpretation logic 225, request generation logic 230 and response analysis logic 240. Herein, the input detection logic 220 is configured to detect one or more types of input data 215, such as digitized audio data 135 and/or text-based chat 145. Upon detection of the input data 215, the input detection logic 220 provides the input data 215 to the interpretation logic 225. The interpretation logic 225 is configured to conduct analytics on the input data 215 to determine the "intent" of the input data 215.

As mentioned above, upon receipt of the digitized audio data 135, the interpretation logic 225 translates the digitized audio data 135 into one or more groups of words (e.g., strings of characters and/or symbols), and subsequently, processes the one or more word groups to produce a resultant word group for analysis. According to one embodiment of the disclosure, the processing of the word groups into the resultant word group may include, but is not limited or restricted to the following: (i) parsing the word groups, (ii) identifying words through natural language programming (NLP) processing that are deemed to be significant (e.g., contribute to the determination of the intent of the digitized audio data 135), and (iii) removing those words that is insignificant in determining such intent. Hence, utilizing NLP and machine learning processing (e.g., comparison of different word patterns with known word patterns directed to certain intentions), the interpretation logic 225 is configured to determine the intent of the digitized audio data 135.

Once the intent has been determined, the request generation logic 230 is configured to select a prescribed event request message 150 for use in gathering information that is directed to satisfying the request associated with the input data 215. As described above, the event request message 150 includes slots, namely fields of the message 150 that provide parameters needed by the fulfillment logic 120 to initiate requests to certain cloud resources for data in response to the event request message 150, where these requests may be directed to access information from resources (e.g., software components) within the VPC 200, within the first public cloud network 210, and/or within other public cloud networks 250. Hence, from a single request, the conversational interface 100 is able to access and retrieve information from software components residing within multiple (different) cloud networks.

With respect to the text-based chat 145, however, the interpretation logic 225 organizes the text-based chat 145 into one or more word groups and processes the word group(s) to produce a resultant word group for analysis. Similar to the description above, the interpretation logic 225 formulates the resultant word group by at least (i) parsing the word groups, (ii) identifying words, through NLP processing, that are significant in determining intent of the text-based chat 145, and (iii) removing those words that is insignificant in capturing such intent. Once the intent has been determined, the request generation logic 230 is configured to select the event request message 150 for use in gathering information that is directed to satisfying the request associated with the input data 215, as described above.

The response analysis logic 240 is configured to communicate with the fulfillment logic 120 to receive data associated with the request by the user as presented by the input data 215. Depending upon the source of the input data 215, as maintained by the conversation analytic service 110, the returned data may be in the form of audio data 242 or text-based chat 244.

According to one embodiment of the disclosure, the fulfillment logic 120 may be logic that interacts with a controller and/or a communication service provider such as Aviatrix™ CoPilot™ as described in U.S. patent application Ser. No. 17/127,920 filed Dec. 18, 2020, the contents of which are incorporated by reference herein. For example, the fulfillment logic 120 may include data acquisition logic 260, including API selection logic 270 and response generation logic 275. For this embodiment, after receipt of the event request message 150, the data acquisition logic 260 determines the type of accesses are to be performed in order to recover data in response to the event request message 150.

According to one embodiment of the disclosure, the API selection logic 270 determines what APIs 170 are relied upon to initiate one or more queries to recover the data needed to respond to the event request message 150. As an illustrative example, one of the APIs 170 may be directed to a controller 280 being a cloud resource within the first public cloud network 210, and in particular, a web component that controls operability of a virtual network based on components within the VPC 200 and/or other VPCs that may overlay public cloud network infrastructure. The controller 280 may be configured to receive the queries and access cloud resources (e.g., gateways, cloud services, etc.) that are monitored and/or controlled by the controller 280. As another illustrative example, the API selection logic 270 may be configured to access resources associated with multiple public cloud networks (e.g., public cloud networks 210 and 250), such as controllers deployed within each of these public cloud networks.

The data acquisition logic 260 is further configured with the response generation logic 275. The response generation logic 275 aggregates the data responsive to the event response message 150 and generates an event response message 290. The data acquisition logic 260 provides the event response message 280 to the response analysis logic 240 deployed within the conversation analytic service 110. The response analysis logic 240 determines the originating input source (e.g., client 130 or 140) of the input data 215 from which the event request message 150 was generated, and conducts a translation (conversion) of the content of the event response message 290 into a format suitable for the voice client 130 (e.g., audio data 242) or the chatbot client 140 (e.g., text-based chat 244 for subsequent translation by the client 140 itself).

Figure 3:
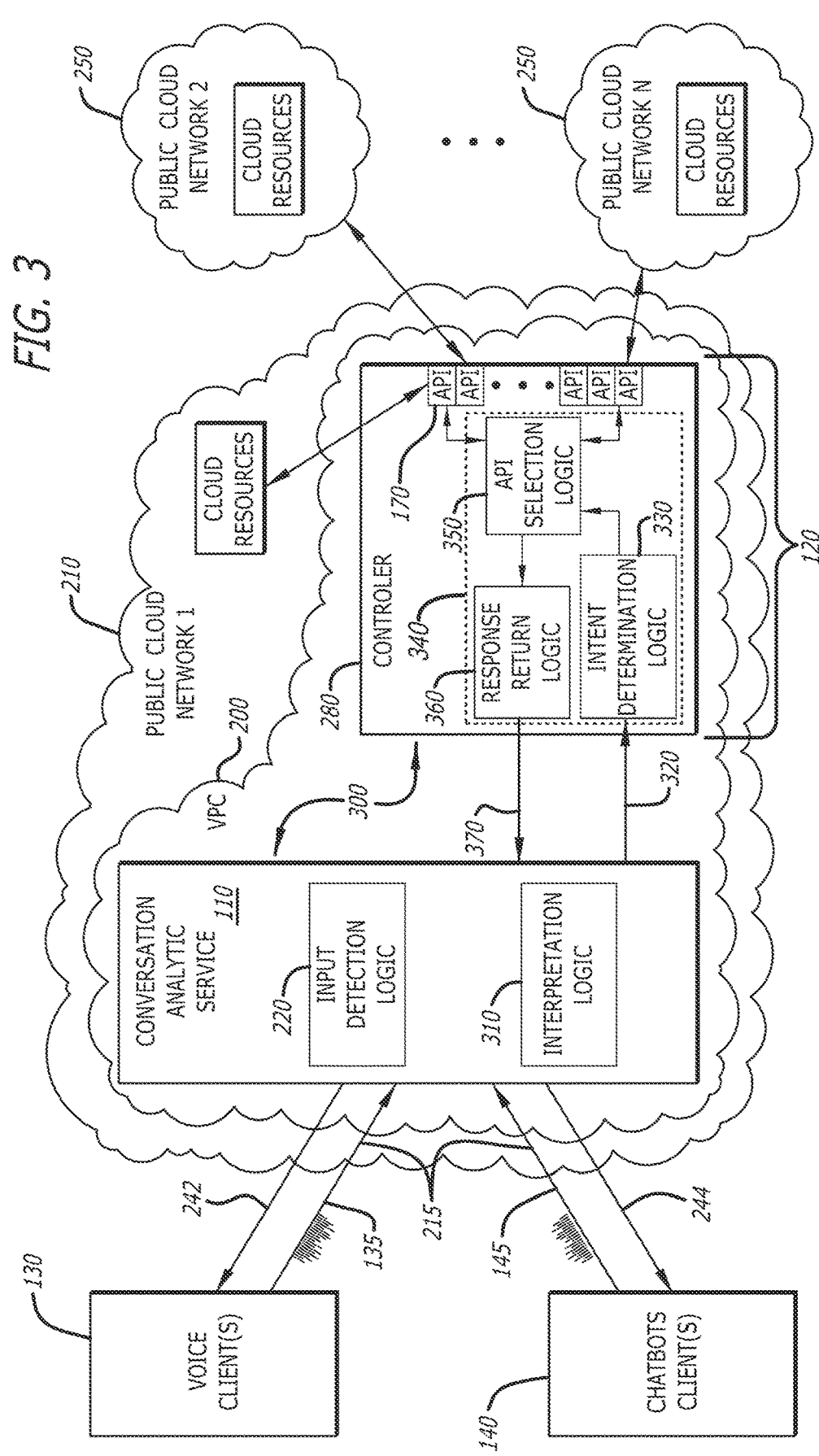
FIG. 3 is a second exemplary embodiment of a virtual private cloud, deployed within the first public cloud network, that includes the conversational interface of FIG. 1.

Referring now to FIG. 3, a second exemplary embodiment of the VPC 200, deployed within the first public cloud network 210, which includes the conversational interface 100 of FIG. 1 is shown. In general, the conversational interface 300 operates in a manner similar to the conversational interface 100 of FIG. 2. However, for this embodiment, the conversation analytic service 110 is configured to include the input detection logic 220 and interpretation logic 310, which is configured to generate a resultant word group 320 from the one or more word groups formulated based on the received input data 215. The resultant word group 320 may be provided to a portion of the interpretation logic 330 (referred to as "intent determination logic 330"), deployed within data acquisition logic 340 within the fulfillment logic 120, where the intent determination logic 330 is responsible for determining the "intent" of the input data 215 in a manner similar to the interpretation logic 225 of FIG. 2.

According to one embodiment of the disclosure, as shown in FIG. 3, the data acquisition logic 340 further includes API selection logic 350 and response return logic 360. After receipt of the information associated with the intent of the input data, as determined by the intent determination logic

330, the API selection logic 350 determines what APIs 170 are relied upon to initiate one or more queries to recover the data needed to respond to the initial input data 215. The response generation logic 360 aggregates the data retrieved by the API selection logic 350 and returns a response 370 in which the content of the response 370 may be translated (or converted) into a format suitable for the voice client 130 (e.g., audio data) or the chatbot client 140 (e.g., text-based chat) that provided the input data 215.

III. Operational Flow

Figure 4:
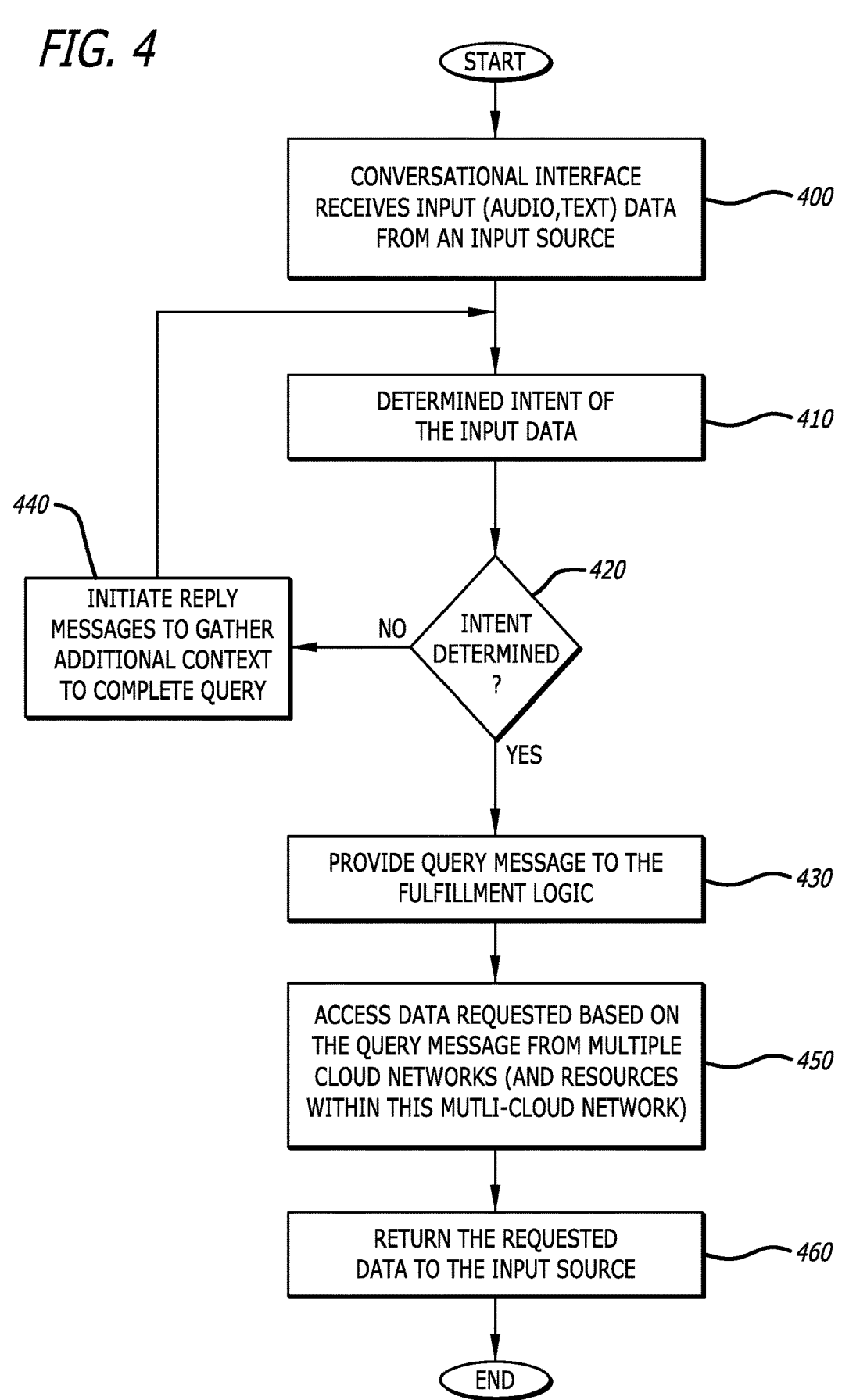
FIG. 4 is a flowchart of an exemplary embodiment of the operability of the conversational interface.

Referring now to FIG. 4, a flowchart of an exemplary embodiment of the operability of the conversational interface 100 of FIG. 1 is shown. Herein, according to one embodiment of the disclosure, residing in a first public cloud network, the conversational interface receives input data from an input source, where the input data is or is based on audio (voice) data (operation 400). Thereafter, the input data is processed to determine its "intent" (operation 410). Based on the determined intent, a query message is provided to fulfillment logic, such as a controller for example, to determine the cloud resources to be accessed to suitably respond to a query associated with the input data (operations 420 and 430). Otherwise, the conversational interface returns reply messages to solicit (and gather) additional context information to complete the query message (operations 420 and 440).

Where the cloud resources to be accessed reside in one or more public cloud network other than the first public cloud network, the controller accesses such resources residing within the multi-cloud network (e.g., VPCs associated with the same user, etc.) and returns data retrieved from such resources (operations 450 and 460). Collectively, the data may be directed to multi-cloud infrastructure management (e.g., operational metrics retrieved from VPCs within multiple public cloud networks associated with a common user) or multi-cloud infrastructure orchestration (e.g., changes in cloud-based software components and other architectural changes within the VPC).

As described or suggested above, the operational advantages associated with the conversational interface 100 may include, but are not limited or restricted to the following:

(1) Multi-cloud infrastructure management: Provision, manage and control cloud infrastructure such as adding VPCs, register on-premises devices, configure tunnels, etc.

(2) Operational Efficiency

Reporting: Generation of reports such as billing, security, compliance etc. for delivery by a preferred communication medium (e.g., email, text, or other external channel).

Automatic tracing/debug: For critical events leading to service disruption, automatically open a support cases and upload relevant debug information such as logs, metrics, etc.

(3) Situational Awareness

Support Push Model: The service can monitor critical infrastructure and communicate important network events and provide daily reports as audio streams. Events of interest maybe a combination of user defined items and inferred from queries made by the user (e.g., queries such as the number of accesses to the VPCs between non-working hours, confirmation of successful data backups, etc.).

Compliance & Governance: On demand infrastructure audits such as traffic analysis, security audits, etc.

(4) Access to highly contextualized information

Informational: FAQs and KB articles can be queried making it easy for customers to access critical technical information.

Multi-lingual: Providing the same content in many languages automatically will help with internationalization effort in non-English speaking countries.

Find technical content: Be able to ask technical questions answered across CSP and proprietary networks.

(5) Telemetry

Automated Sentiment analysis: Infer sentiment from conversations and mine data on how product is being used Embodiments of the invention may be embodied in other specific forms without departing from the spirit of the present disclosure. The described embodiments are to be considered in all respects only as illustrative, not restrictive. The scope of the embodiments is, therefore, indicated by the appended claims rather than by the foregoing description. All changes that come within the meaning and range of equivalency of the claims are to be embraced within their scope.

What is claimed is:

1. A system comprising:

a conversation analytic service configured to:

(i) translate incoming data pertaining to a query into one or more groups of words, (ii) process the one or more groups of words into a resultant word group for determining an intent associated with the incoming data, and (iii) generate an event request message comprising a plurality of parameters related to one or more cloud resources to determine the intent associated with the incoming data, wherein the plurality of parameters comprises a first number of parameters for a first query type and a second number of parameters for a second query type; and a fulfillment logic communicatively coupled to the conversation analytic service, the fulfillment logic comprising application programming interface (API) selection logic configured to determine which APIs are relied upon to initiate one or more queries to retrieve data associated with the intent from cloud resources, wherein the fulfillment logic further comprises response generation logic configured to aggregate data retrieved via the APIs into an event response message, wherein the event response message is returned to the conversation analytic service for generation of a response to the query associated with the incoming data, wherein the conversation analytic service is configured to process the one or more groups of words by at least (i) parsing the one or more groups of words, (ii) identifying words used in natural language programming (NLP) processing that are significant in determining intent of the incoming data, and (iii) removing any words that are insignificant to capture data.

2. The system of claim 1, wherein the incoming data constitutes audio data from a voice client.

3. The system of claim 1, wherein the incoming data constitutes a text-based chat from a chat client.

4. The system of claim 1, wherein the words that are significant are the words within the one or more groups of words that contribute to a determination of the intent of the incoming data.

5. The system of claim 1, wherein upon determining an insufficient number of significant keywords have been identified, the conversation analytic service to prompt retrieval of additional context information for generating the event request message.

6. The system of claim 1, wherein the query is directed to a number of compute resources being a part of the cloud resources or an amount of available cloud storage.

7. The system of claim 1, wherein the determining of the intent by the conversation analytic logic comprises utilizing machine learning analytic logic and natural language programming (NLP) processing logic to understand an intended purpose of the query.

8. The system of claim 1, wherein the fulfillment logic is configured to obtain the retrieved data from cloud resources associated with a plurality of public cloud networks.

9. The system of claim 1, further comprising response analysis logic communicatively coupled to the conversation analytic service, the response analysis logic being configured to (i) determine an originating input source of the incoming data from which the event request message was generated, and (ii) conduct a translation of the content of the event response message into a first format for a voice client or a second format for a chat client.

10. A method comprising:

translating incoming data pertaining to a query into one or more groups of words;

processing the one or more groups of words into a resultant word group for determining an intent associated with the incoming data by at least (i) parsing the one or more groups of words, (ii) identifying words from the one or more groups of words used in natural language programming (NLP) processing that are significant in determining intent of the incoming data, and (iii) removing any words from the one or more groups of words that are insignificant to capture data;

generating an event request message comprising a plurality of parameters related to that includes one or more cloud resources to determine the intent associated with the incoming data, wherein the plurality of parameters comprises a first number of parameters for a first query type and a second number of parameters for a second query type;

retrieving data associated with the intent from cloud resources identified via an application programming interface (API) selection logic;

aggregating the retrieved data into an event response message; and returning the event response message to the conversation analytic service for generation of a response to the query associated with the incoming data.

11. The method of claim 10, wherein the incoming data constitutes audio data from a voice client.

12. The method of claim 10, wherein the incoming data constitutes a text-based chat from a chat client.

13. The method of claim 10, wherein the words that are significant are the words within the one or more groups of words that contribute to a determination of the intent of the incoming data.

14. The method of claim 10, wherein the processing of the one or more groups of words into the resultant word group further comprising:

upon determining an insufficient number of significant keywords have been identified, prompting retrieval of additional context information for generating the event request message.

15. The method of claim 10, wherein the query is directed to a number of compute resources being a part of the cloud resources or an amount of available cloud storage.

16. The method of claim 10, wherein the determining of the intent of the incoming data comprises utilizing machine learning analytic logic and natural language programming (NLP) processing logic to understand an intended purpose of the query.

*    *    *    *    *